Dec. 11, 1934.    R. L. EVENBURGH    1,983,845

SHEAVE

Filed Dec. 7, 1929

Inventor
Ralph L. Evenburgh
Wilson, Darwell, McCanna & Kehm
Attys

Patented Dec. 11, 1934

1,983,845

UNITED STATES PATENT OFFICE 1,983,845

SHEAVE

Ralph L. Evenburgh, Mishawaka, Ind., assignor to Dodge Manufacturing Corporation, Mishawaka, Ind., a corporation of Delaware Application December 7, 1929, Serial No. 412,407

6 Claims. (Cl. 64—17)

My invention relates to sheaves, and aims to provide an improved construction for grooved sheaves.

In a concurrent application for patent filed December 7, 1929, Serial No. 412,406, I have disclosed an improved grooved sheave construction comprising a collection of annular discs or rings formed from sheet or plate metal and referred to as pressed steel discs. These discs, formed with deflected rim portions and axially spaced opposite abutment face portions, are bound or clamped together in assembly on a hub, with the discs arranged in alternately facing positions, thereby providing sheave grooves or belt races by divergent rims of pairs of cooperating discs.

In bringing out the present invention, I have had in view the provision of a sheave construction of the type referred to especially desirable for smaller diameter sheaves which are customarily employed in multiple belt drives.

My present invention is embraced within and affords the principal advantages of the former invention, with special features of improvement hereinafter indicated.

The invention will be readily understood by reference to one practicable embodiment thereof which is shown for illustration in the accompanying drawing.

Figure 1:
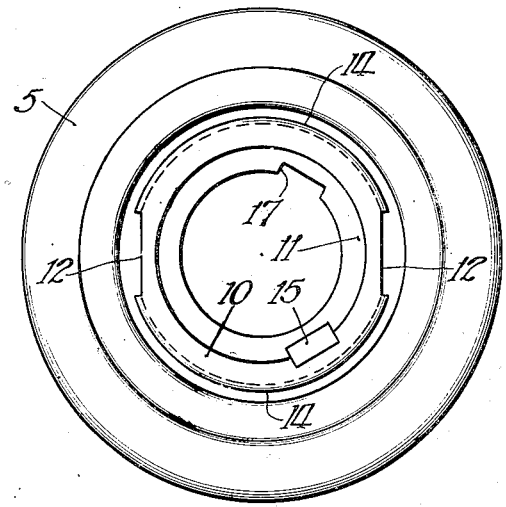
Fig. 1 is an end view of the illustrative sheave.
Figure 2:
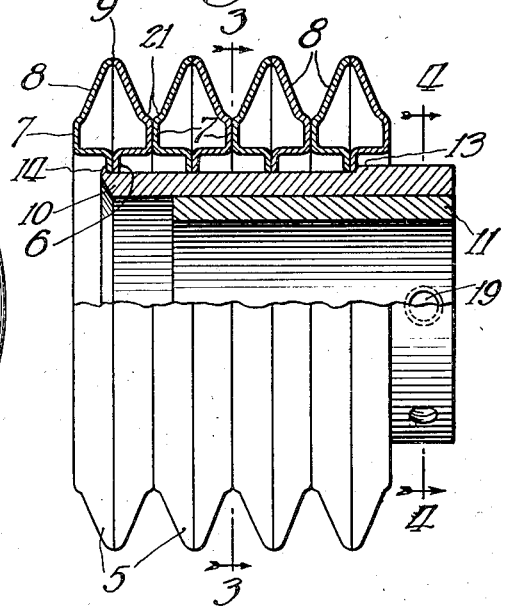
Fig. 2 is a half longitudinal section and half side elevation of the sheave.
Figure 3:
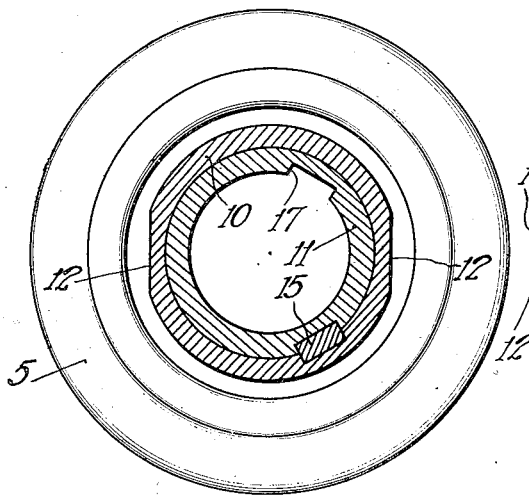
Fig. 3 is a cross section on the line 3—3 of Fig. 2.
Figures 4, 5:
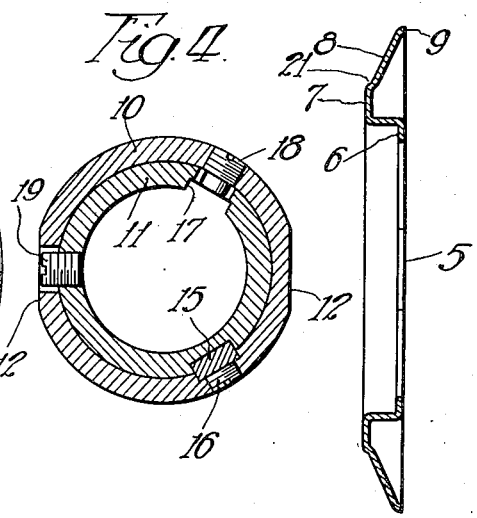
Fig. 4 is a cross section on the line 4—4 of Fig. 2.
Fig. 5 is a cross section of one of the discs of this sheave.

The illustrative sheave comprises a collection of pressed steel discs or rings 5. These are upset to form annular shoulders which stiffen the rings and provide abutment face portions 7 concentric and parallel with but axially offset from the central abutment face portions 6, and are formed with rim portions 8 extending from the offset portions 7 and deflected toward the back faces of the central abutment portions 6. The said central abutment portions 6 are shown as short flanges, the rings in this instance being bent near their inner edges to provide the laterally extending portions from which spring the abutment face portions 7 and deflected rims 8 extending therefrom.

The discs which are bound in assembly on a hub 10 and secured fast thereon, are arranged in alternately facing positions, as shown, thereby providing a sectional grooved sheave for engagement by a plurality of driving belts; the grooves of the sheave being formed by the divergent rims of pairs of symmetrically disposed discs which bear against each other at the abutment face portions 7 and against the adjacent discs at the central abutment face portions 6.

As will presently appear, the binding of the assembled discs together is accomplished in this instance by embracing or clamping them between hub shoulders bearing against the outer sides of the central flanges 6 of the two outermost or end discs, so that the pressure due to the binding is applied fairly close to the shouldered portions of the discs, and by virtue of the form and arrangement of the discs the binding pressure is sustained by the abutting portions of the discs within the rim portions, relieving the rim margins of compressive strain.

It is desirable to have adjacent discs abut one another at their outer edges, to obtain a substantially continuous grooved sheave perimeter, as well as to have the deflected rim portions of the discs support or brace one another. Therefore in this instance, where the discs bear against one another through directly contacting abutment faces, the rim portions 8 of the discs are shown terminating in flat faced edges 9 flush with or in the planes of the back abutment faces. However, since the discs are entirely within the spaces bounded by the planes of their opposite abutment faces, the compressive strain due to the binding of the discs is sustained and transmitted inwardly of the deflected rim portions, there being substantially no transmission of compression through the rims. By forming the rims with curved margins as shown, a desirable stiffening and strengthening effect is obtained, while the curved abutting margins also form rounded edges or shoulders between the grooves of the sheave, as is obviously desirable.

The precise form, inclination and width of the rim portions of the discs will be suited to the form and dimensions of the grooves required by the particular driving belts employed, V-shaped grooves for engagement by correspondingly formed driving belts are shown in this instance. The width of these grooves might be increased by interposing liners between the abutment faces of the confronting discs, and the distance between the groove centers might be increased by interposing liners between the back faces of adjacent discs.

A driving connection between the sheave hub and the assembled discs thereon is established in the illustration shown by forming the hub member 10 with opposite flat surfaces 12 and similarly forming the bores of the discs to fit the hub. Thus the individual discs are firmly held in non-rotatable relation to the hub by broad engaging surfaces. As all the discs are driven through these surfaces all of them in engagement with the belts will equally transmit the driving torque, while the two outermost or end discs, in the specific construction shown, furnish the same backing and rigidifying for the two end belt-race units of the sheave that are provided for the intervening units.

The hub 10 is shown as a sleeve having an exterior shoulder 13 provided by an enlarged end of the sleeve. This sleeve is preferably made from a section of steel tubing of approximately $\frac{5}{16}$" thickness, for example, which is finished smooth on the inside and turned on the outside to a slightly reduced thickness, for instance ¼", excepting at the end which is left the original size to provide the shoulder 13. The steel tube or sleeve is then finished flat on the opposite sides to provide the surfaces 12 through which the drive is transmitted between the hub and discs. At the end opposite the enlarged or shouldered end, the steel tube is beveled from the inside out as shown to provide a tapered edge. The discs punched with their inner bores shaped to fit the hub are then threaded on the hub in their proper arrangement and pressed together tightly with one of the end discs abutting against the shoulder 13, and the opposite tapered end of the steel tube or sleeve is then spun over the flange 6 of the opposite disc, thereby tightly binding the assembled discs together, and at the same time securing the collection of discs in fixed position on the hub.

As the discs are of a form which tends to stiffen them and abut against one another with flat contact faces at right angles to the axis of the sheave, and are firmly held together and connected fast with the hub, as stated, the construction as a whole is of a character to prevent any lateral deflection or tilting of the discs, and to maintain the important quality of having the belt races always in true line.

The construction described is of practicable and efficient character, and well adapted for the smaller diameter sheaves used in multiple belt transmissions. It will be appreciated that by virtue of the form of the discs, and through the use of the steel tube or sleeve 10 as a hub, functioning substantially as a tubular rivet to bind the discs together, only a slight amount of the ring thickness or radial dimension between the bores and outer peripheries of the steel discs is consumed in the binding, so that the ring thickness need not be much greater than required to provide the belt races and the adjacent abutment face portions of the discs. Thus the central portions of the discs may be short flanges as shown. Hence for a given sheave size, for instance of 5" or 6" diameter, the maximum permissible bore of the rings may be substantially greater than would otherwise be practical, accordingly permitting the use of a correspondingly larger hub. Or, for a given outside hub diameter, the total sheave diameter may be less than would otherwise be practicable. A slight saving in the total diameter is obtained by the slight reverse bends in the discs indicated at 21, which also contribute an additional stiffening effect.

The hub 10, which may be applied to a shaft directly or with an interposed bushing, is shown in this instance fitted on an interchangeable bushing 11. A key holding the hub and bushing against relative rotation is indicated at 15. A set screw 16 holds the key against longitudinal movement. The keyway 17 on the bushing is adapted to receive a key for engagement with a like keyway in the shaft to hold the hub in non-rotatable relation to the shaft. A set screw to hold this key against longitudinal displacement is indicated at 18. A third set screw 19 is adapted to bear against the shaft to prevent axial displacement of the sheave on the shaft.

Sheaves and pulleys are usually manufactured in different sizes with a certain range of standard hub bores and used with interchangeable bushings to adapt them to different shaft sizes. In the case of sectional sheaves for use in multiple V-belt drives, a problem has been presented to obtain a construction that would be entirely practicable to manufacture in the smaller sizes for use with interchangeable bushings. Consider for example a 5" diameter sheave to be used with interchangeable bushings on different shaft sizes ranging up to 1½" diameter. Allowing a minimum thickness of ¼" for the bushing, and a similar thickness for the hub, this would require an outside hub diameter of 2½"; so that the available dimension for the ring thickness of the annular grooved body of the sheave would be only 1½". In this connection the importance of the present invention will be appreciated as providing a construction permitting a comparatively small ring thickness. It is entirely practicable to manufacture sheaves of the illustrative construction in the smaller sizes used in multiple belt drives, i. e. in sizes as small as 5" diameter, for use with interchangeable bushings in accordance with usual practice.

In the construction shown, the hub is longer than and projects beyond one end of the bushing, offsetting the grooved sheave body relative to the bushing, so as to obtain a desired offset of the sheave with reference to the end of a shaft on which the sheave is to be used.

It will be understood that the invention is not limited to the particular embodiment thereof herein shown and described. The foregoing description is not to be understood as limiting the invention otherwise as defined by the claims.

Notice is given that the structure herein described and claimed embodies an invention which is disclosed and broadly claimed in my said copending application Serial No. 412,406; the claims of this application being for a species or for specific subject matter not specifically disclosed in said copending application.

What I claim as my invention, and desire to secure by Letters Patent, is:

1. A sheave comprising a collection of pressed steel discs formed with annular shoulders and deflected rim portions and flat central abutment portions, said discs being arranged alternately face to face and back to back, the confronting discs cooperating to provide belt races and abutting one another adjacent to the belt races and abutting the adjacent discs centrally, the central abutment portions of the discs being short flanges at right angles to the axis of the sheave, and a hub on which the discs are fitted in driving engagement therewith, said hub comprising a sleeve formed at one end to provide an exterior shoulder centrally engaging one of the end discs, and having its opposite end spun over the central portion of the opposite end disc, whereby the discs are bound together and secured in fixed position on the hub.

2. A sheave comprising a collection of pressed steel discs formed with annular shoulders and deflected rim portions and flat central abutment portions, said discs being arranged alternately face to face and back to back, the confronting discs cooperating to provide belt races and abutting one another adjacent to the belt races and abutting the adjacent discs centrally, the central abutment portions of the discs being short flanges at right angles to the axis of the sheave, and a hub on which the discs are mounted and by which the discs are bound together by portions of the hub engaging said flanges of the outer or end discs, said hub having flat portions and said disks having correspondingly shaped bores fitting the hub.

3. A sheave comprising a tube and annular discs fitted thereon in driving connection therewith, said discs having flat central portions and formed with annular abutment face portions surrounding but axially offset from the flat central portions and with deflected rims extending from said abutment face portions and terminating in flat-faced edges substantially flush with said flat central portions, and the discs being arranged in alternately facing positions, confronting discs having their rims diverging and bearing against one another at said abutment face portions and bearing against the adjacent discs at said edges and central portions, and said tube having means cooperating with the central portions of the end discs for binding the collection of discs together.

4. A sheave comprising a hub, a plurality of sheet metal discs fitted on the hub in driving engagement therewith, the hub and bores of the discs being non-circular to provide such driving engagement, said discs having flat central portions of small radial thickness and being formed with deflected rims terminating in flat-faced edges parallel with the planes of the discs and being all of the same size and form and arranged in pairs of symmetrically disposed abutting discs with their rims diverging and with adjacent rims of adjacent pairs abutting at their said flat-faced edges, and shoulders on the hub engaging the central portions of the end discs whereby the discs are bound or clamped in assembly, one of said shoulders being applied after the assembly to effect the binding, said discs being held in their proper relative positions by coaction with one another and being without interposed spacing means and free of tying or binding means other than said shoulders engaging the end discs.

5. A sheave having a hub, a plurality of uniform sheet metal discs each formed with a flat central portion and an annular struck up front abutment portion and a surrounding rearwardly inclined portion extending from said front abutment portion, the outer marginal portion of each disc having a back abutment face in the same plane as the back face of said central portion, said discs arranged alternately face to face and back to back on said hub, confronting discs having their said front abutment portions cooperating and their surrounding inclined portions diverging to form complemental belt race walls, adjacent discs in back to back relation cooperating at their central and outer marginal portions, an abutment shoulder on the hub coacting with one of the end discs, and means on the hub coacting with the other end disc to clamp the several discs between said means and shoulder, there being driving connection between the hub and discs.

6. A sheave comprising a hub, a plurality of sheet metal discs assembled in pairs on the hub, each pair of discs having cooperating abutment portions and surrounding diverging portions providing complemental belt race walls, all of said discs being alike and having flat central portions from which the aforesaid abutment portions are struck up, said discs having bent outer marginal portions providing back abutment faces parallel with the front abutment faces and flush with the back faces of said flat central portions, adjacent discs of adjacent pairs having their said back abutment faces cooperating, said hub having a flat side, the discs having correspondingly shaped bores and being fitted on the hub in direct driving engagement therewith, an abutment shoulder on the hub coacting with one of the end discs, and means on the hub coacting with the other end disc whereby the assembled discs are clamped between said means and shoulder, said discs being held in their proper relative positions by coaction with one another and being without interposed spacing means and free of tying or binding means other than the aforesaid shoulder and coacting means on the hub.

RALPH L. EVENBURGH.